US010165413B1

(12) United States Patent
High et al.

(10) Patent No.: US 10,165,413 B1
(45) Date of Patent: *Dec. 25, 2018

(54) COMMUNICATION SYSTEM AND METHOD

(71) Applicant: Walmart Apollo, LLC, Bentonville, AR (US)

(72) Inventors: Donald R. High, Noel, MO (US); Brian Gerard McHale, Oldham (GB); Michael Dean Atchley, Springdale, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,402

(22) Filed: Aug. 10, 2018

Related U.S. Application Data

(63) Continuation of application No. 15/877,742, filed on Jan. 23, 2018, now Pat. No. 10,091,623, which is a
(Continued)

(51) Int. Cl.
*H04W 24/00* (2009.01)
*H04W 4/02* (2018.01)
(Continued)

(52) U.S. Cl.
CPC .... *H04W 4/027* (2013.01); *G06Q 10/063112* (2013.01); *G06Q 10/063114* (2013.01);
(Continued)

(58) Field of Classification Search
CPC ....... H04L 12/185; H04L 51/38; H04L 67/18; H04L 12/28; H04W 4/029; H04W 4/02;
(Continued)

(56) References Cited

U.S. PATENT DOCUMENTS 8,254,881 B2 *  8/2012  Shaw ................. G06Q 20/102
                                                       235/379
8,334,901 B1 * 12/2012  Ganick ................. G01S 1/70
                                                       348/131
(Continued)

FOREIGN PATENT DOCUMENTS

EP         2830016 A1 *  1/2015  ......... G06Q 10/1053

OTHER PUBLICATIONS

Dave Rusk, "Indoor Tracking Using DecaWave UWB DW1000 Chip (SK Telecom, S. Korea)," YouTube.com, Feb. 17, 2014.
(Continued)

*Primary Examiner* — Mahendra Patel
(74) *Attorney, Agent, or Firm* — Schmeiser, Olsen & Watts LLP

(57) ABSTRACT

A communication system comprises a mobile reporting device and a server. The mobile reporting device comprises a signal receiver configured to receive data usable to determine the location of the reporting device; a communication module configured to transmit data to and receive data from a server, the data including location data from the location determiner; a display including a user interface. The server comprises a database with a location module configured to store a default room location for a plurality of personnel; a server communication module configured to transmit data to and receive data from the reporting device; an information module configured to provide information on the personnel; a controller configured to determine, based on the location data, which personnel default locations are within a predetermined distance of the reporting device, to control the server communication module to transmit to the reporting device information from the information module regarding the personnel associated with the default locations within the predetermined distance for display on the user interface.

18 Claims, 9 Drawing Sheets

Related U.S. Application Data continuation of application No. 15/720,303, filed on Sep. 29, 2017, now Pat. No. 9,913,103, which is a continuation of application No. 15/211,115, filed on Jul. 15, 2016, now Pat. No. 9,820,107.

(60) Provisional application No. 62/193,850, filed on Jul. 17, 2015.

(51) Int. Cl.
| | | |
|---|---|---|
| *H04W 4/30* | (2018.01) | |
| *H04L 29/08* | (2006.01) | |
| *H04W 4/44* | (2018.01) | |
| *G06Q 10/06* | (2012.01) | |

(52) U.S. Cl.
CPC ............ *H04L 67/18* (2013.01); *H04L 67/306* (2013.01); *H04L 67/36* (2013.01); *H04W 4/30* (2018.02); *H04W 4/44* (2018.02)

(58) Field of Classification Search
CPC ..... H04W 24/00; H04W 76/14; H04W 88/04; G06Q 10/08; G06K 7/10366; G06K 2017/0045; G06F 19/00; G08B 13/14; H04B 7/2126; H04B 7/005; H04B 7/212
USPC ........ 455/456.1, 414.1, 422, 406; 705/14.53, 705/35; 348/159, 131
See application file for complete search history.

(56) References Cited

U.S. PATENT DOCUMENTS

| | | | | |
|---|---|---|---|---|
| 9,324,106 | B2* | 4/2016 | Argue | G06Q 30/0639 |
| 9,443,218 | B2* | 9/2016 | Stiefel | G06Q 10/08 |
| 9,470,532 | B2* | 10/2016 | Pellow | G01C 21/206 |
| 9,595,062 | B2* | 3/2017 | Goulert | G06Q 30/0633 |
| 9,607,486 | B2* | 3/2017 | Acker, Jr. | G07G 1/0081 |
| 9,633,390 | B2* | 4/2017 | Acker, Jr. | G06Q 30/0633 |
| 9,820,107 | B2 | 11/2017 | High et al. | |
| 2002/0115453 | A1* | 8/2002 | Poulin | G06F 17/3087 |
| | | | | 455/456.4 |
| 2005/0135305 | A1* | 6/2005 | Wentink | H04B 7/2126 |
| | | | | 370/329 |
| 2007/0282621 | A1* | 12/2007 | Altman | G06Q 10/10 |
| | | | | 705/319 |
| 2008/0039121 | A1* | 2/2008 | Muller | H04M 7/0036 |
| | | | | 455/456.3 |
| 2008/0086261 | A1* | 4/2008 | Robinson | A63F 13/12 |
| | | | | 701/532 |
| 2008/0287143 | A1* | 11/2008 | Banks | H04W 64/00 |
| | | | | 455/456.5 |
| 2009/0082038 | A1* | 3/2009 | McKiou | H04L 12/185 |
| | | | | 455/456.6 |
| 2013/0211715 | A1* | 8/2013 | Bae | G01S 19/48 |
| | | | | 701/469 |
| 2013/0317916 | A1* | 11/2013 | Gopalakrishnan | ............ G06Q 30/0261 |
| | | | | 705/14.66 |
| 2014/0207570 | A1* | 7/2014 | Cancro | G06Q 30/0255 |
| | | | | 705/14.53 |
| 2014/0249883 | A1 | 9/2014 | Cicchitto et al. | |
| 2016/0125505 | A1* | 5/2016 | Goulart | G06Q 30/0633 |
| | | | | 705/26.8 |
| 2016/0247207 | A1* | 8/2016 | Yeom | G06Q 30/02 |

OTHER PUBLICATIONS

"Taking Store Operations to the Next Level", Theatro, Theatro.com, accessed May 2015; 8 pages.
"Mapping the Indoor Marketing Opportunity", Opus Research, Inc., Jan. 2014; 26 pages.
Ho, Victoria, "Wi-Fi Indoor Positioning Firm YFind Launches Analytics Tool", TechCrunch.com, May 6, 2013; 7 pages.
Combined Search and Examination Report in UK Patent Application No. GB1611983.6, dated Jan. 17, 2017; 9 pages.
Notice of Allowance in U.S. Appl. No. 15/211,115, dated Jul. 5, 2017; 24 pages.
Notice of Allowance in U.S. Appl. No. 151720,303, dated Dec. 18, 2017; 26 pages.
Examination Report in UK Patent Application No. GB1611983.6, dated Jan. 11, 2018; 8 pages.
First Office Action in Mexican Patent Application No. MX/a/2016/009320 dated Mar. 2, 2018; 4 pages.
Examination Report in U.K. Patent Application No. GB1611983.6 dated Jul. 12, 2018; 7 pages.
Notice of Allowance in U.S. Appl. No. 15/877,742, dated Jun. 22, 2018; 20 pages.

* cited by examiner

COMMUNICATION SYSTEM AND METHOD

RELATED APPLICATIONS

This application is a continuation application of U.S. patent application Ser. No. 15/877,742 filed on Jan. 23, 2018, entitled "COMMUNICATION SYSTEM AND METHOD," which is a continuation application of U.S. patent application Ser. No. 15/720,303 filed on Sep. 29, 2017, now U.S. Pat. No. 9,913,103 entitled "COMMUNICATION SYSTEM AND METHOD," which is a continuation application of U.S. patent application Ser. No. 15/211,115 filed on Jul. 15, 2016, now U.S. Pat. No. 9,820,107, entitled "COMMUNICATION SYSTEM AND METHOD," which claims priority to U.S. Provisional Patent Application Ser. No. 62/193,850, filed on Jul. 17, 2015 entitled "COMMUNICATION SYSTEM AND METHOD," the entirety of which is incorporated by reference herein.

FIELD OF THE DISCLOSURE

The present disclosure relates generally to communication systems and methods.

BACKGROUND

In large organizations it is practically impossible for all colleagues to be aware of and familiar with all other colleagues. This can be particularly exacerbated for senior management or leaders within an organization who may come across a great many colleagues at diverse geographical locations. With time often at a premium and personal interactions being of such importance, this can cause difficulties.

SUMMARY

In accordance with embodiments of the present disclosure, there is disclosed a communication system comprising: a mobile reporting device and a server; the mobile reporting device comprising: a location signal receiver configured to receive data usable to determine the location of the reporting device; a communication module configured to transmit data to and receive data from a server, the data including location data from the location signal receiver; a display including a user interface; the server comprising: a database with a location module configured to store a default room location for a plurality of personnel; a server communication module configured to transmit data to and receive data from the reporting device; an information module configured to provide information on the personnel; a controller configured to determine, based on the location data, which personnel default locations are within a predetermined distance of the reporting device, to control the server communication module to transmit to the reporting device information from the information module regarding the personnel associated with the default locations within the predetermined distance for display on the user interface.

In accordance with embodiments of the present disclosure, there is also disclosed a communication system comprising: a mobile reporting device, a mobile communication device and a server; the mobile reporting device comprising: a first location signal receiver configured to receive data usable to determine the location of the reporting device; a first communication module configured to transmit data to and receive data from a server, the data including location data from the first location signal receiver; a display including a user interface; the mobile communication device comprising: a second location signal receiver configured to receive data usable to determine the location of the mobile communication device; a second communication module configured to transmit and receive data to the server, the data including location data from the second location signal receiver; the server comprising: a server communication module configured to transmit data to and receive data from the reporting device; an information module configured to provide information on the personnel; a controller configured to determine, based on the location data, which mobile communication device locations are within a predetermined distance of the reporting device, to control the server communication module to transmit to the reporting device information from the information module regarding the personnel associated with the reporting devices within the predetermined distance.

In some embodiments, the information is selected from one or more of:
  how to say name of personnel in written form and/or as an audio message;
  image of personnel;
  personal interests of personnel;
  assignments of personnel;
  personnel performance statistics;
  area performance statistics relevant to personnel; achievements of personnel; and
  goals of personnel.

In some embodiments, the predetermined distance is selected from one of 10 meters or 5 meters or 3 meters.

In some embodiments, the server includes a map module, the map module being configured to store mapping information of the locality including a 2D or 3D rendering of the current location. And wherein the server is configured to provide as the information a map indicating where the located person is located relative to the current location of the reporting device.

In some embodiments, the mobile reporting device is a lap top computer, a PDA, a tablet, a mobile phone, a smart watch, or smart glasses.

In some embodiments, the mobile reporting device is configured to display an image of any personnel within the predetermined distance and whereby an individual image can be selected by a user to view the information associated with the specified person.

In some embodiments, the location signal receiver comprises a sensor configured to receive a light signal and to process the light signal to determine a modulation of the light signal and to transmit to the server light signal modulation data.

In some embodiments, the system further comprises a plurality of modulated light emitters, wherein each emitter has a different modulation from the others and the server database is configured whereby the location of the reporting device is determined from the modulated light signals.

In some embodiments, the user interface includes the option for the reporting device not to receive certain data types as selected by a user.

In some embodiments, the predetermined distance is adjusted dynamically over time according to the distance to the nearest communication device, or to maintain the number of communication devices below a predetermined threshold.

In some embodiments, the information includes comparative information showing the change of the information over time, where relevant.

In accordance with embodiments of the present disclosure, there is also disclosed a communication method for use with a system comprising: a mobile reporting device and a server; the method comprising: the mobile reporting device determining the location of the reporting device; transmitting to and receiving data from a server, the data including location data from the location determiner; storing in the server a default room location for a plurality of personnel; transmitting data to and receiving data from the reporting device; the server including an information module configured to provide information on the personnel; determining, based on the location data, which personnel default locations are within a predetermined distance of the reporting device, to control the server to transmit to the reporting device information from the information module regarding the personnel associated with the default locations within the predetermined distance for display on the user interface.

In accordance with embodiments of the present disclosure, there is also disclosed a communication method for use with a system comprising: a mobile reporting device, a mobile communication device and a server; the method comprising the steps of: determining the location of the reporting device; transmitting to and receiving data from a server, the data including location data from the first location determiner; determining the location of the mobile communication device; transmitting to and receiving data from the server, the data including location data from the second location determiner; providing information on the personnel; a controller configured to determine, based on the location data, which mobile communication device locations are within a predetermined distance of the reporting device, to control the server to transmit to the reporting device information from the information module regarding the personnel associated with the reporting devices within the predetermined distance.

Any combination or permutation of the embodiments is envisioned. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Exemplary embodiments will now be described, by way of example only, with reference to the following drawings, in which.

DESCRIPTION OF PREFERRED EMBODIMENTS

Figure 1:
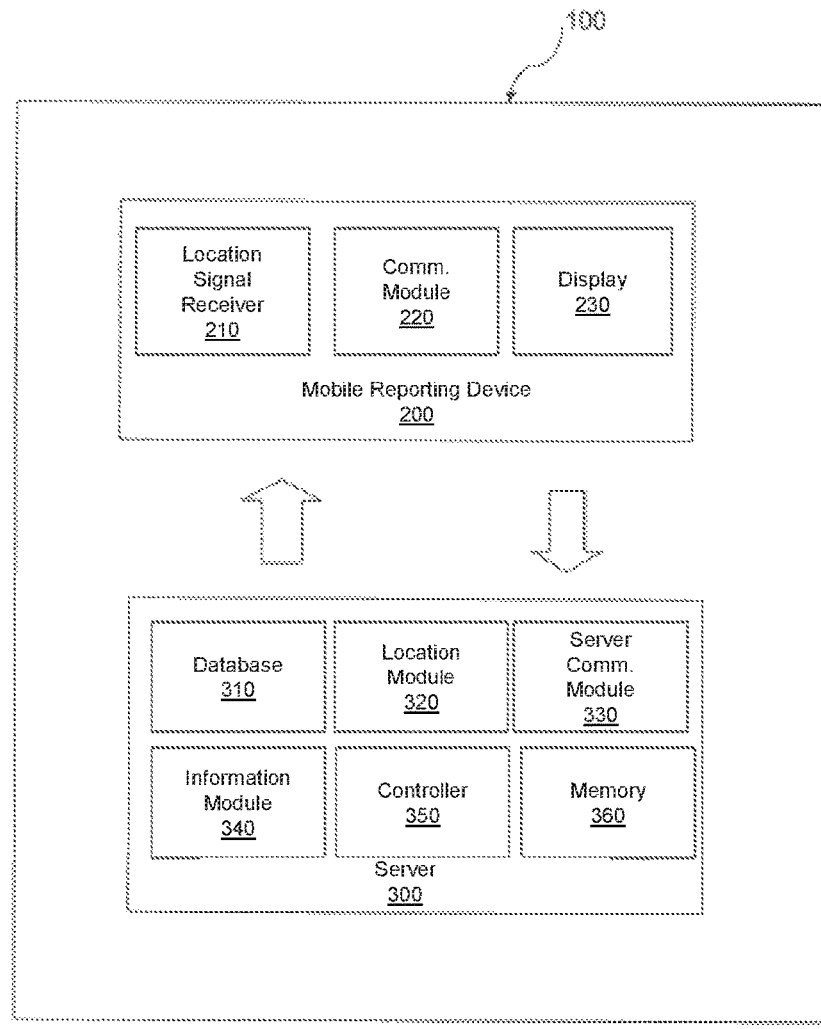
FIG. 1 is a schematic illustration of an exemplary communication system, in accordance with some embodiments.

Referring to FIG. 1 of the accompanying drawings, there is illustrated a communication system 100 according to an embodiment of the present disclosure.

The communication system 100 comprises a mobile reporting device 200 and a server 300.

The mobile reporting device 200 comprises a location signal receiver 210, a communication module 220 and a display 230.

Typically, the mobile reporting device will be any of: a smart phone, a lap-top, a tablet, a PDA, a smart watch or other wearable smart technology.

The location signal receiver 210 can be any suitable receiver to be used to determine the location of the mobile reporting device 200. For the present embodiment a camera of the mobile reporting device 200 is used as a location signal receiver 210 as explained in more detail below.

The communication module 220 is configured to transmit data to and receive data from the server 300. Typically this will be over a telephony network, but other wireless communication channels such as Wi-Fi, iBeacons and Bluetooth™ or the like can be used.

The display 230 can be constructed and arranged to include a user interface for the mobile reporting device 200.

The server 300 comprises a database 310 with a location module 320, a server communication module 330, an information module 340, a controller 350 and a memory 360. The location module 320 stores default room locations for a plurality of personnel. These can be set up in any way desired, but typically will be an office location, a work station location, a meeting room location or a default meeting location for each of a plurality of people.

The server communication module 330 transmits data to and receives data from the mobile reporting device 200. Typically this will be over a telephony network, but other wireless communication channels such as Wi-Fi and Bluetooth™ can be used.

The information module 340 includes a database containing relevant information on personnel. The information contained could be of any type, but examples may include but not be limited to:

how to say name of personnel in written form and/or as an audio message;
image of personnel;
personal interests of personnel;
assignments of personnel;
personnel performance statistics;
area performance statistics relevant to personnel;
achievements of personnel; and
goals of personnel.

The information in the database may also include hierarchical information in the case of the personnel being members of an organization, typically employees within an organization.

Figure 2:
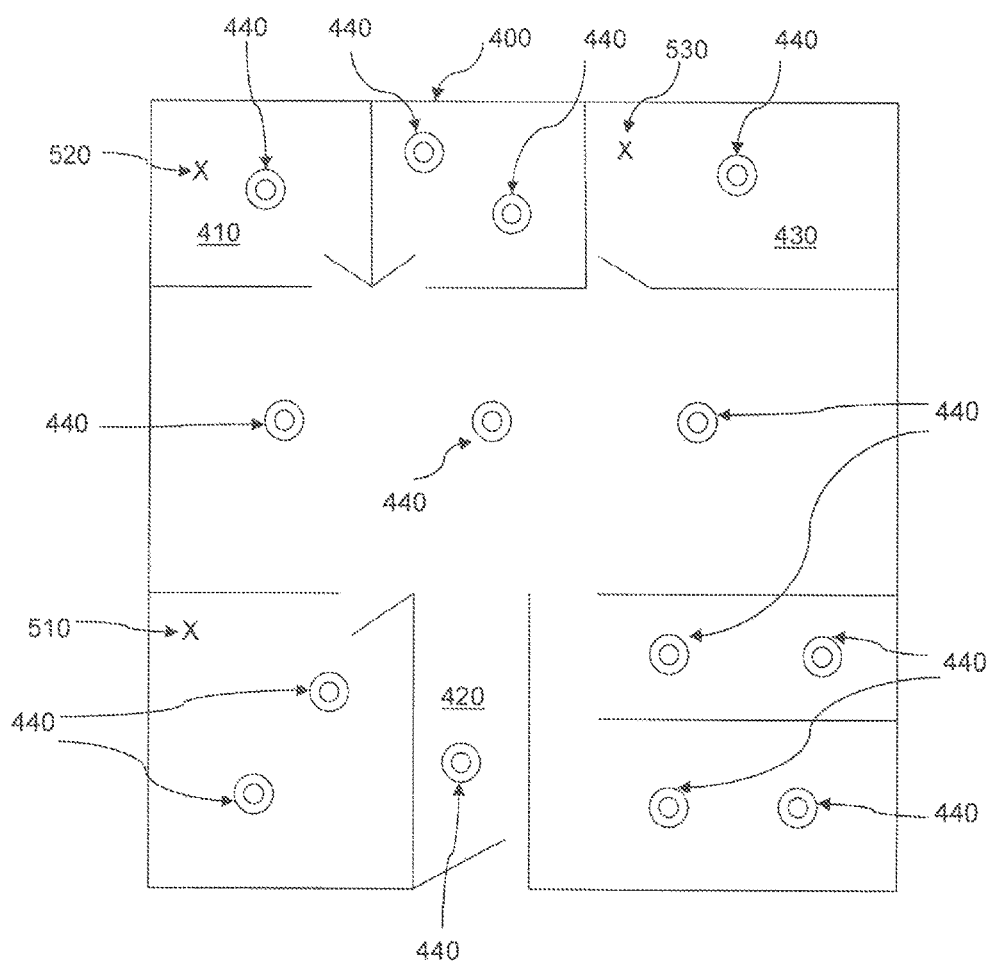
FIG. 2 is a schematic illustration of a location in which the communication system shown in FIG. 1 could operate, in accordance with some embodiments.

Referring to FIG. 2 of the accompanying drawings, the system 100 is configured to operate in a location 400. In this exemplary embodiment the location is a building, e.g., an office, but it will be appreciated that the system can be used in any location with varying degrees of precision dependant on the location technology available. The location 400 includes a plurality of rooms, including offices 410, corridors 420 and storage areas 430. Throughout the location 400 are a plurality of emitters 440 or related electronic devices that generate, output, and/or process signals, and are intended to enable the location of the mobile reporting device 200.

In one embodiment, the emitters 440 are modulated visible light emitters, an example of which being Byte-Light™ emitters. Each emitter emits visible light with a unique modulation. These can be picked up by the camera 210 of the mobile reporting device 200. The modulation of the visible light is not visible to the human eye, but can be detected by the camera 210 of the mobile reporting device 200. This can be used to generate a modulation signal that is transmitted from the mobile reporting device 200 using the communication module 220 to the server 300 via the server communication module 330. The server 300 has a memory 360 containing data representing a 2D or 3D map of the location 400 and the positioning of the emitters 440 within the location 400. Thus, based on the modulation signal(s) received by the server it can deduce the location of the mobile reporting device 200 within the location 400.

Within the location 400 are one or more default locations 510, 520, 530 Typically these are locations associated with a particular user, such as an office or meeting room as determined from the location module 320 of the server 300.

Referring to FIGS. 3-6 of the accompanying drawings an example of a communication method using the communication system described above will now be described.

Figure 3:
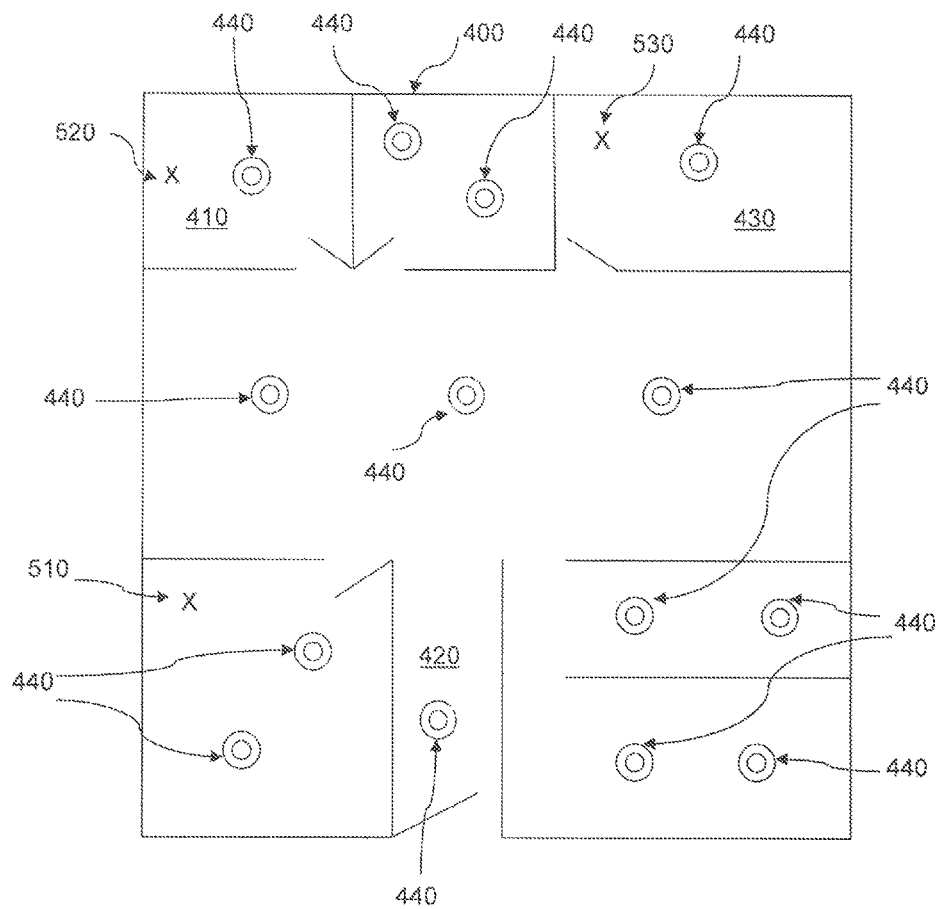
FIG. 3 is schematic illustration similar to FIG. 2 with a user approaching the location, in accordance with some embodiments.

FIG. 3 shows a 2D representation of the location 400 with a user 500 approaching the location 400. The user 500 has a mobile reporting device 200.

The server 300 determines the position of the mobile reporting device 200, and thereby the user 500, using the emitters 440 as described above.

Figure 4:
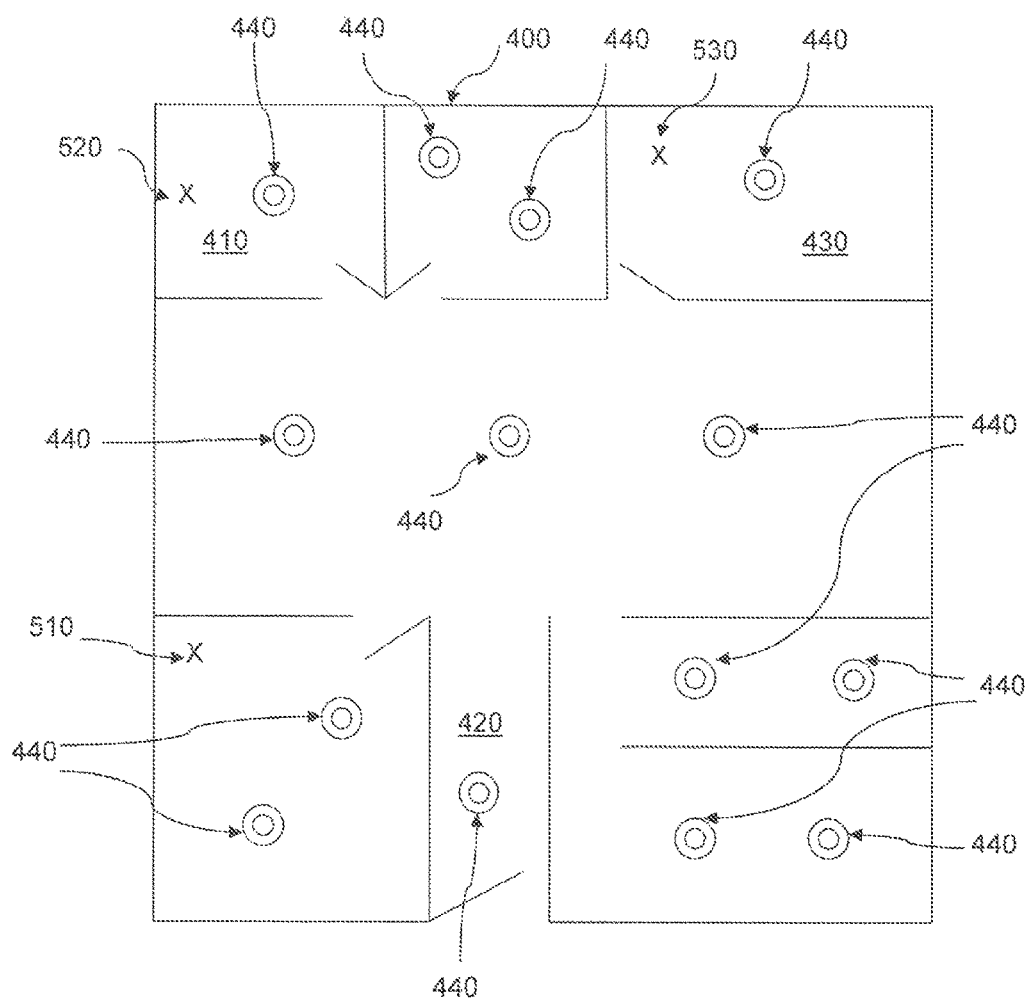
FIG. 4 is schematic illustration similar to FIG. 2 with a user approaching to within a predetermined distance of default locations, in accordance with some embodiments.
Figure 5:
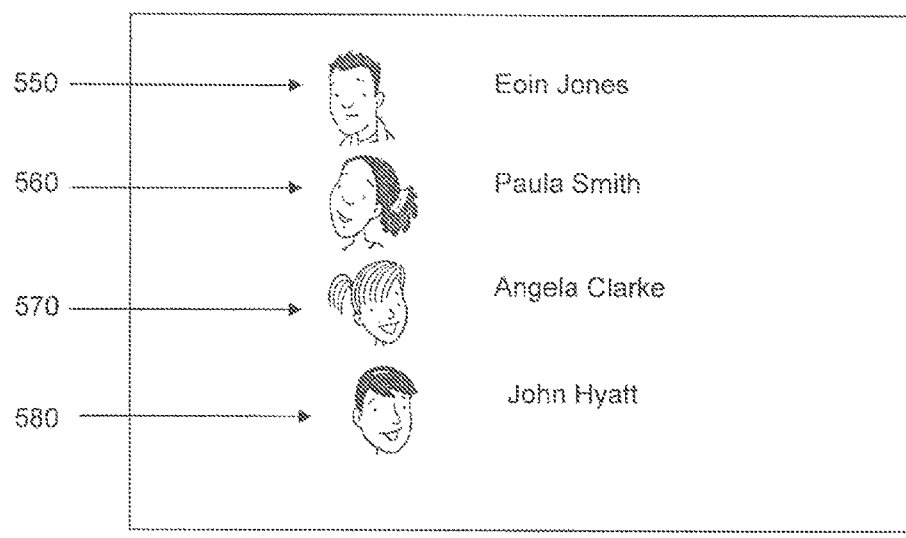
FIG. 5 is an illustration of identification information displayed on a display of the mobile reporting device, in accordance with some embodiments.

Referring to FIG. 4, as the user 500 gets to within a predetermined distance of default locations 510, 520, 530 and 540 of personnel at the location 400 the display 230 of the mobile reporting device 200 displays identifiers 550, 560, 570 and 580 of the personnel associated with the respective default locations as shown in FIG. 5.

The predetermined distance can be set to be any desired. Exemplary predetermined distances are 3 meters, 5 meters and 10 meters.

The identifiers 550, 560, 570 and 580 can be, for instance, names or images of the personnel.

Figure 6:
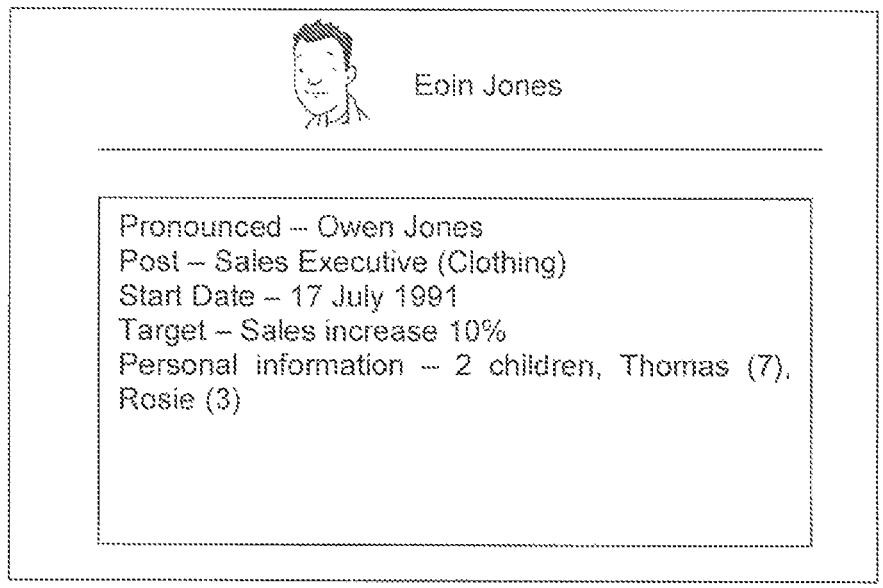
FIG. 6 is an illustration of personnel information displayed on the display of the mobile reporting device, in accordance with some embodiments.

The user 500 can then select a personnel identifier, say 550 in this case and then the mobile reporting device 200 transmits a request for information to the server 300, which responds with the information on the relevant person. An example of a display of personnel information is shown in FIG. 6 of the accompanying drawings.

Additionally, using the position information of the user and the default location in combination with the 2D/3D map information, the mobile reporting device 200 can display a 2D/3D map indicating the current location of the device 200 and the default location 510 of the selected person.

Figure 7:
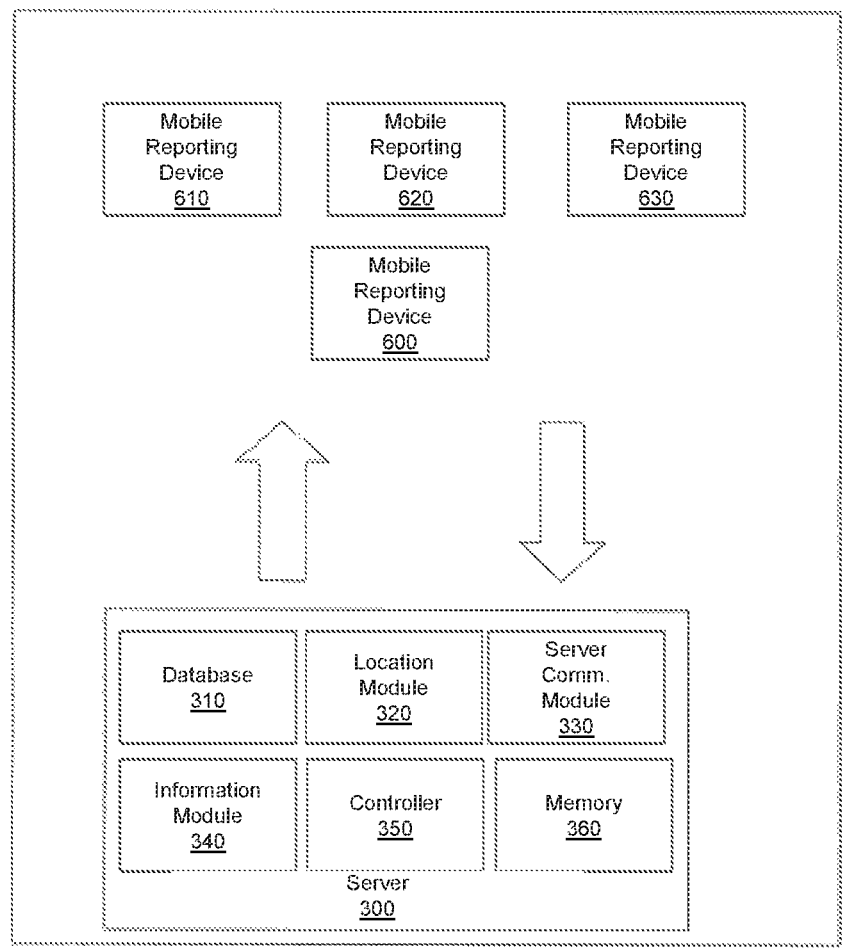
FIG. 7 is a schematic illustration of another exemplary communication system, in accordance with some embodiments.

Referring to FIG. 7 of the accompanying drawings, there is shown a communication system of an alternative embodiment. In FIG. 7 there is shown a communication system comprising a plurality of mobile reporting devices 600, 610, 620, 630 (there can be any number) and a server 300. Each of the mobile reporting devices 600, 610, 620, 630 is substantially similar to the mobile reporting device 200 described above, so they will not be described in further detail. The server 300 is substantially similar to the server 300 of FIG. 1.

Figure 8:
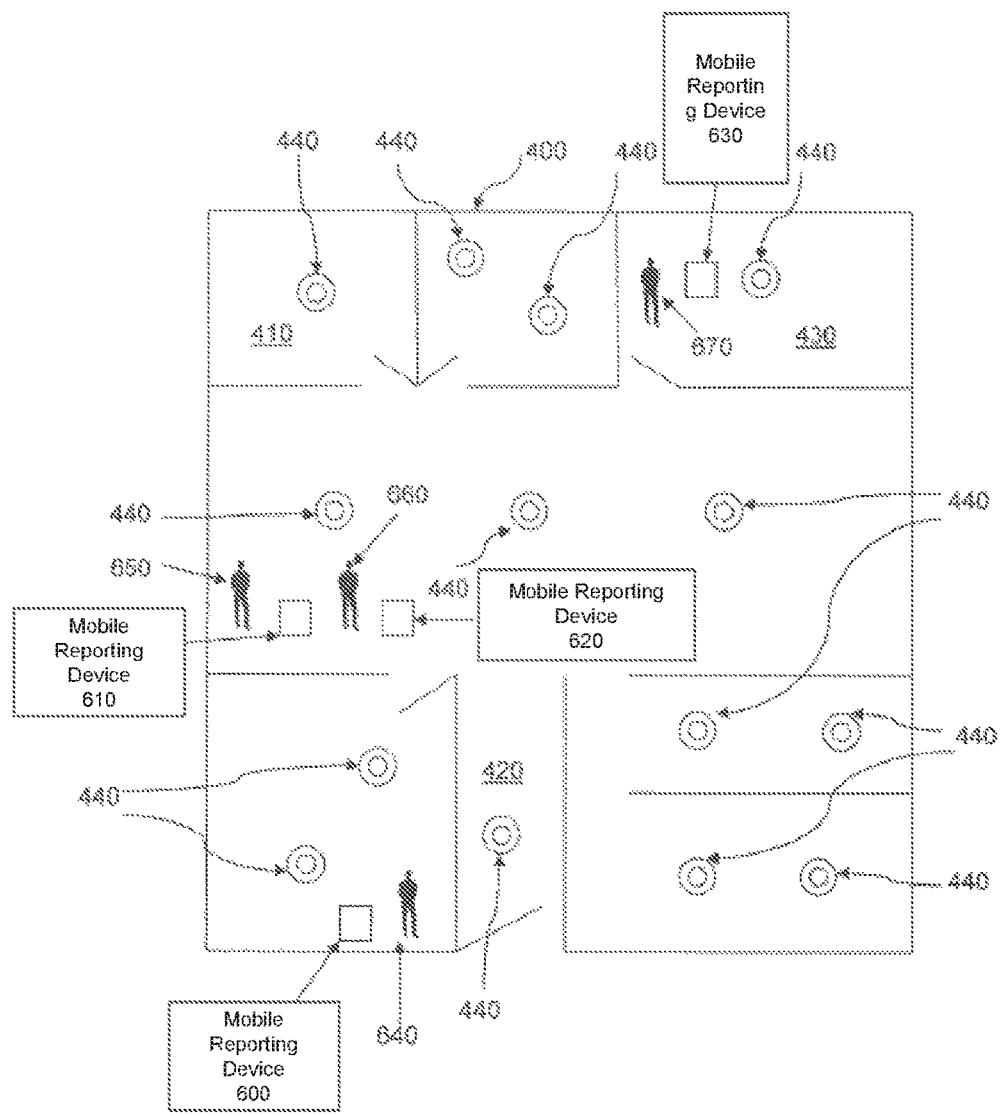
FIG. 8 is a schematic illustration of a location in which the communication system shown in FIG. 7 could operate, in accordance with some embodiments.

Referring to FIG. 8 of the accompanying drawings showing a location 400, each device 600, 610, 620, 630 is associated with a user 640, 650, 660, 670. The association is created by a user logging into a device 600, 610, 620, 630. The server 300 matches the log in details with personal information in the information module 340.

Once logged in a user 640, 650, 660, 670 is classed as a leader or a non-leader. A device classed as a leader can be regarded as an active device. An active device is, in effect, looking for relevant personnel to report on. A non-leader device can be regarded as a passive device that, in effect, is just transmitting a location so acts as a mobile communication device. In this embodiment, the user 640 using device 600 is classified as a leader and the other users are classified as non-leaders.

As the leader device 600 gets to within a predetermined distance of another device 610, 620, 630, the leader device 600 displays identifiers of those individuals who are within the predetermined distance, e.g. as shown in FIG. 5. The user 640 can then select an individual in the same manner as described above in relation to FIG. 6. The user 640 can then approach any of the users 650, 660, 670 of the other devices 610, 620, 630 with knowledge about the respective user. Thus barriers to interaction can be diminished.

Although in this embodiment the device 600 is described as being the same as the other devices 610, 620, 630, it will be appreciated that the devices can differ.

A feature of exemplary embodiments can be that a user can configure their device or their account settings to be applied to the device, to configure the information that is presented.

For instance, a user can select the default locations or personnel it wishes to be notified of. In that way, a user will not receive the unwanted clutter of notifications about default locations or personnel about which the user has no interest.

A user can also select from the available types of information as to what is to be displayed. Information may be sorted into groups to enable a user to select types of information. For instance, there could be groups of: personal information, service history, targets, current performance, analytics, and so on.

Information can be presented, for instance, in a hierarchical manner from company, location department, section, individual, and so on.

It will be appreciated that the embodiments of providing information about default locations and about other devices can be combined together so that a user is notified of both default locations and device locations (associated with personnel) at the same time. The predetermined distances may differ for each. The display 230 may tag whether the location is based on a default location or on another device.

Another configurable option on the device 200 is to adjust the predetermined distance over time according to the distance to the nearest communication device or to maintain the number of communication devices (non-leaders) below a predetermined threshold.

It will be appreciated that in some hierarchical organizational uses, a device may be a leader device for those beneath the user in the hierarchy and a non-leader device in relation to those above the user in the hierarchy.

Figure 9:
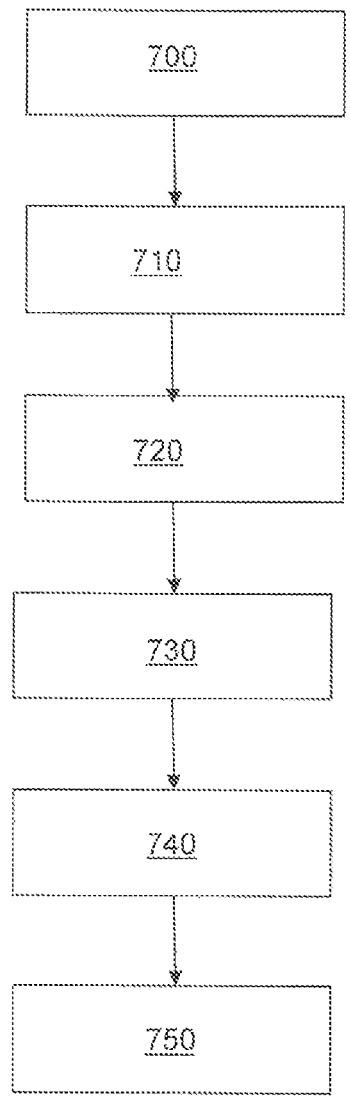
FIG. 9 is a flow diagram illustrating a method of operation of the communication system, in accordance with some embodiments.

Referring to FIG. 9 of the accompanying drawings, there is shown a flow diagram illustrating implementation of exemplary embodiments for a business environment from the perspective of a manager operating a leader's device. In describing the method, reference may be made to elements of FIGS. 1-8. For example, some or all of the method of FIG. 9 may be performed at computer-based elements of FIGS. 1-8.

In step 700 the information module 340 of the server 300 has stored therein information about personnel. This can be any of the information referred to above, but is not limited thereto.

In step 710 the information is sorted so that a manager or leader is associated with their direct reports. This enables subsequent filtering of data if required.

In step 720 a user logs on to their account on the mobile reporting device 200 or 600. Other users, direct reports of the manager, are already logged on to their corresponding devices. The manager can make selections as to the information he or she wishes to be presented with.

In step 730, as the manager uses an electronic device and navigates around a location with geo-location facilities installed, the location of the manager's device 600 is tracked along with the locations of other corresponding devices 610, 620, 630.

In step 740, when the device 600 comes within a predetermined distance of a default location 510, 520, 530, 540 or of another device 610, 620, 630, the device 600 displays identification information of the individuals associated with the locations or devices (see FIG. 5).

In step 750, the manager can select an individual and be presented with personnel information on the individual (see FIG. 6).

Thus, embodiments of the present disclosure provide a way for a user to be informed about the people they are about to meet in various ways.

Although a few preferred embodiments have been shown and described, it will be appreciated by those skilled in the art that various changes and modifications might be made without departing from the scope of the present development, as defined in the appended claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality.

In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination.

In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

What is claimed is:

1. A communication method for use with a communication system, comprising:
   configuring a location signal receiver of the communication system to receive data usable to determine a location of a mobile reporting device;
   configuring a communication module of the communication system to transmit data to and receive data from a computer server, the data including location data from the location signal receiver;
   displaying from the location data a two dimensional (2D) or three dimensional (3D) map indicating a current location of the mobile reporting device and a default location for a person of interest within a predetermined distance of the mobile reporting device;
   outputting by the communication module a selected personal identifier to the computer server, and in response receiving information for display; and
   adjusting the predetermined distance of the mobile reporting device dynamically over time according to the distance to a nearest communication device, or maintaining by the mobile reporting device a number of communication devices below a predetermined threshold.

2. The communication method of claim 1, further comprising:
   configuring the mobile reporting device to display an image of any personnel of a plurality of personnel within the predetermined distance whereby an individual image can be selected by a user to view information associated with a specified person.

3. The communication method of claim 1, further comprising:
   storing in the computer server a default room location for a plurality of personnel;
   configuring the server to include an information module that provides information on the personnel;
   determining, based on the location data, which personnel default locations are within a predetermined distance of the reporting device, to control the server to transmit to the reporting device information from the information module regarding the personnel associated with the default locations within the predetermined distance for display on the mobile reporting device.

4. The communication method of claim 2, further comprising:
   determining by a controller configured to, based on the location data, which mobile communication device locations are within a predetermined distance of the reporting device, to control the server to transmit to the reporting device information from the information module regarding the personnel associated with the reporting devices within the predetermined distance.

5. The communication method of claim 1, wherein the mobile reporting device is configured to display an image of any personnel within the predetermined distance and whereby an individual image can be selected by a user to view information associated with a specified person.

6. The communication method of claim 1, wherein each mobile reporting device is classified as a leader device or a non-leader device, wherein the leader device searches for personnel of interest at a location within a general location, the non-leader device transmits location data to the computer server, and the leader device displays an identifier related to the non-leader device when the leader device is a predetermined distance from the non-leader device.

7. The communication method of claim 6, wherein the computer server is configured to provide to the leader device a map indicating where a user of the non-leader device is located relative to the current location of the leader device.

8. The communication method of claim 6, wherein the computer server generates information about the default locations and about other devices that are combined together so that the leader device displays for a user both default locations and device locations associated with the personnel at the same time.

9. The communication method of claim 1, further comprising:
   emitting, by a plurality of modulated visible light emitters, visible light having a unique identification detected by the mobile reporting device; and
   generating by the mobile reporting device a modulation signal to determine a location of the mobile reporting device relative to the default location.

10. A communication method for use with a communication system, comprising:
    storing a default location for a plurality of people;
       transmitting by a computer server of the communication system data to and receive data from a mobile reporting device, including location data of the mobile reporting device, and to provide information on the plurality of people;
    determining by a controller of the communication system, based on the location data, which default locations of a general location are within a predetermined distance of the mobile reporting device, to control the computer server to transmit to the mobile reporting device information regarding the people associated with the default locations within the predetermined distance for display on the mobile reporting device; and
    receiving by the mobile reporting device a source of light emitted by at least one light emitter of a plurality of light emitters, wherein the at least one light emitter emits light with a unique modulation for receipt by the mobile reporting device, which generates a modulation signal that is processed by the computer server to determine a location of the mobile reporting device within the general location;
    storing by the computer server mapping information including a 2D or 3D map of the general location and the positioning of the light emitters within the general location;
    outputting by the mobile reporting device a selected personal identifier to the computer server, and in response receiving information for display; and
    adjusting the predetermined distance of the mobile reporting device dynamically over time according to the distance to a nearest communication device, or maintaining by the mobile reporting device a number of communication devices below a predetermined threshold.

11. The communication method of claim 10, wherein the computer server comprises an information module that storing by the computer server the information regarding the people and outputs the information regarding the people to the mobile reporting device under control by the controller.

12. The communication method of claim 10, wherein the computer server generates information about the default locations and about other devices that are combined together so that the mobile reporting device displays for a user both default locations and device locations associated with the people at the same time.

13. A communication method for use with a communication system, comprising:
    receiving by a signal receiver of the communication system data usable to determine the location of the reporting device;
    exchanging location data with a mobile reporting device of the plurality of mobile reporting devices, wherein each mobile reporting device is classified as a leader device or a non-leader device;
    searching by the leader device for personnel of interest at a location within a general location;
    transmitting by the non-leader device location data to a computer server;
    outputting by a mobile reporting device of the plurality of mobile reporting devices a selected personal identifier to the computer server, and in response receiving information for display;
    displaying by the leader device an identifier related to the non-leader device when the leader device is a predetermined distance from the non-leader device;
    emitting by a light emitter of a plurality of light emitters light with a unique modulation for receipt by the mobile reporting device;
    generating by the mobile reporting device a modulation signal that is processed by the computer server to determine a location of the mobile reporting device within the general location; and
    adjusting the predetermined distance of the mobile reporting device dynamically over time according to the distance to a nearest communication device, or maintaining by the mobile reporting device a number of communication devices below a predetermined threshold.

14. The communication method of claim 13, further comprising:
    storing by the computer server mapping information including a 2D or 3D map of the general location and the positioning of the light emitters within the general location.

15. The communication method of claim 13, wherein the light emitters are modulated visible light emitters that emit visible light with a unique modulation detected by a camera of the mobile reporting device.

16. The communication method of claim 13, further comprising:
    monitoring by the computer server information regarding users of the plurality of mobile reporting devices; and
    outputting the information regarding the personnel to the leader device.

17. The communication method of claim 13, wherein the computer server generates information about the default locations and about other devices that are combined together so that the mobile reporting device displays for a user both default locations and device locations associated with the people at the same time.

18. The communication method of claim 13, further comprising:
    dynamically adjusting the predetermined distance over time according to the distance to a nearest communication device or maintaining a number of communication devices below a predetermined threshold; and
    configuring the mobile reporting device to display an image of any personnel of a plurality of personnel within the predetermined distance whereby an individual image can be selected by a user to view information associated with a specified person.

\* \* \* \* \*